(12) United States Patent
Jung

(10) Patent No.: US 7,746,221 B2
(45) Date of Patent: Jun. 29, 2010

(54) METHOD FOR PREVENTING LANE DEPARTURE FOR USE WITH VEHICLE

(75) Inventor: Ho Choul Jung, Seoul (KR)

(73) Assignee: Hyundai Motor Company, Seoul (KR)

( * ) Notice: Subject to any disclaimer, the term of this patent is extended or adjusted under 35 U.S.C. 154(b) by 353 days.

(21) Appl. No.: 12/006,307

(22) Filed: Jan. 2, 2008

(65) Prior Publication Data
US 2008/0238718 A1 Oct. 2, 2008

(30) Foreign Application Priority Data
Mar. 30, 2007 (KR) ............... 10-2007-0031198

(51) Int. Cl.
*B60Q 1/00* (2006.01)
*G08G 1/16* (2006.01)

(52) U.S. Cl. ............ 340/435; 701/41; 701/301; 340/438

(58) Field of Classification Search ......... 340/438, 340/435, 901, 425.5, 903, 937, 436; 701/301, 701/28, 41, 96
See application file for complete search history.

(56) References Cited

U.S. PATENT DOCUMENTS

| | | | |
|---|---|---|---|
| 6,292,752 B1 * | 9/2001 | Franke et al. ............. 701/300 |
| 6,489,887 B2 * | 12/2002 | Satoh et al. ............. 340/436 |
| 6,765,480 B2 * | 7/2004 | Tseng ............. 340/425.5 |
| 6,850,628 B2 * | 2/2005 | Shirato ............. 382/104 |
| 6,993,425 B2 * | 1/2006 | Tange et al. ............. 701/96 |
| 7,069,146 B2 * | 6/2006 | Yamamura et al. ............. 701/301 |
| 7,266,436 B2 * | 9/2007 | Shirato et al. ............. 701/70 |
| 7,571,053 B2 * | 8/2009 | Ishikura ............. 701/301 |
| 2004/0183663 A1 * | 9/2004 | Shimakage ............. 340/436 |
| 2005/0187670 A1 * | 8/2005 | Katayama et al. ............. 701/1 |
| 2007/0198746 A1 * | 8/2007 | Myllyla et al. ............. 709/248 |

* cited by examiner

*Primary Examiner*—Benjamin C Lee
*Assistant Examiner*—Sigmund Tang
(74) *Attorney, Agent, or Firm*—Edwards Angell Palmer & Dodge LLP; Peter F. Corless

(57) ABSTRACT

Disclosed is a method for preventing lane departure for use in a vehicle. The method determines whether the vehicle is moving out of its lane by extracting lane markings from an image inputted by using rear side cameras mounted on both side mirrors, calculating a lane departure distance from the directional angle and side distance calculated by three-dimensional mapping of the extracted lane markings, and estimating a lane departure time through the calculated lane departure distance and a vehicle speed sensed by a vehicle speed sensor, thereby preventing vehicle accidents caused by the driver's lane departure.

5 Claims, 6 Drawing Sheets

METHOD FOR PREVENTING LANE DEPARTURE FOR USE WITH VEHICLE

CROSS-REFERENCE TO RELATED APPLICATION

This application claims under 35 U.S.C. §119(a) the benefit of Korean Patent Application No. 10-2007-0031198 filed on Mar. 30, 2007, the entire contents of which are incorporated herein by reference.

BACKGROUND

1. Technical Field

The present invention relates to method for preventing lane departure for use in a vehicle, and more particularly, to a method for preventing lane departure for use in a vehicle, which can prevent a driver from leaving his/her current traveling lane by a simplified logic.

2. Background Art

Generally, an Advanced Safety vehicle (ASV) is a high-tech vehicle that utilizes high-tech electronics and control technology in order to improve safety of a vehicle, which reduces traffic accidents, save energy, and promote driver's convenience.

A Lane Departure Warning System (hereinafter, referred to as "LDWS"), which is one of ASVs, is a safety equipment for a vehicle, which detects a lane the vehicle is currently traveling by sensing an image in all directions from a camera attached to the vehicle, and then produces a warning signal if the vehicle is about to leave the lane due to the driver's carelessness or dozing off at the wheel.

The LDWS includes a lane detection device for determining whether the vehicle is moving out of the lane by analyzing an image signal of the front of the vehicle and a warning device for warning the driver if the vehicle is moving out of the lane as a result of analysis of the LDWS.

The LDWS of this type is a system suitable for drivers in the countries where the transport network of roads is well-provided and vehicle industry is developed, especially, truck drivers and long-distance commuters, who are exposed to the risk of lane departure accidents due to fatigue from long-time driving, carelessness, and dozing off at the wheel.

FIG. 1 is a block diagram of a conventional method for preventing lane departure for use in a vehicle.

As shown in FIG. 1, a conventional LDWS includes an image sensor for receiving front and rear traveling images, an image processor for performing image processing to recognize lane markings, a departure determining unit for determining whether a vehicle is moving out of the lane on the basis of the recognized lane markings, an interface input unit for receiving a vehicle interface signal, and an interface output unit for issuing a lane departure warning and showing a lane departure situation.

Herein, the vehicle interface is composed of various variables such as a lane width, the curvature radius of the lane, a lane crossing time, and so on.

Here, the image sensor recognizes lane markings on a road by using a single camera mounted at the center between the front and the rear ends of the vehicle, and detects the degree of difference between the center of the recognized lane markings and the optical axis of the camera, thus issuing a lane departure warning.

However, this method has problems in that (i) as various variables are used, the logic becomes complicated and (ii) the accuracy is low because a lot of noises, such as a defect in the sensor, distortion of a camera lens and so on, are included which cause errors in image coordinates and real coordinates.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to solve the above-said problems, and one of the objects is a method for preventing lane departure in a simple way.

In one aspect, the present invention provides a method for preventing lane departure for use in a vehicle, comprising the steps of; (a) extracting lane markings from left and right images of the rear side inputted by cameras mounted on both side mirrors and calculating the real coordinate of the lane markings with the equation of a straight line by three-dimensional mapping of the extracted lane markings; (b) calculating direction angles between the direction line of the vehicle and the real coordinate lines of the lane markings by using the real coordinates of the lane markings calculated in step (a) and calculating side distances between the real coordinate lines of the lane markings and the vehicle; (c) calculating a lane departure distance from the direction angle and side distance calculated in step (b); and (d) warning the driver of the possibility of lane departure depending on the lane departure distance calculated in step (c).

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like. The present methods will be particularly useful with a wide variety of motor vehicles.

Other aspects of the invention are discussed infra.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention, in which.

DETAILED DESCRIPTION

Figure 1:
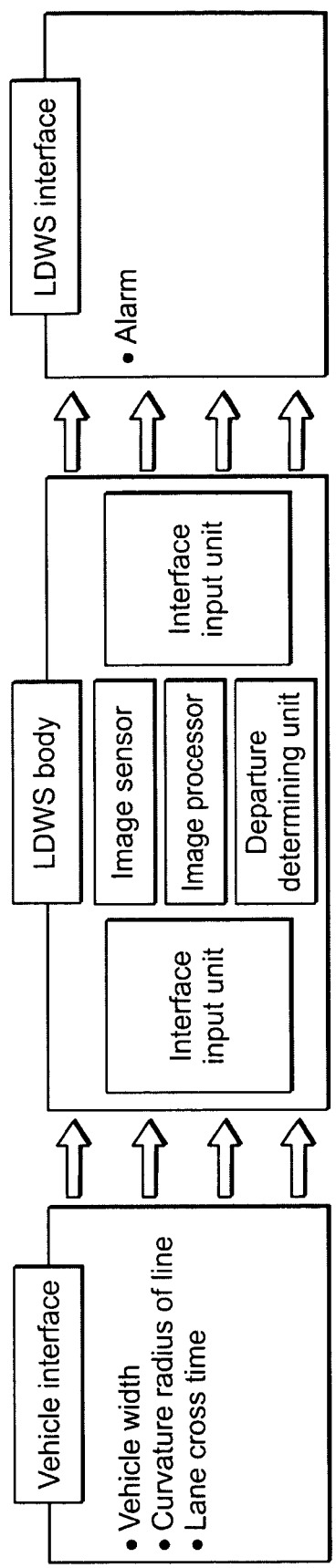
FIG. 1 is a block diagram of a conventional method for preventing lane departure for use in a vehicle.

Hereinafter, preferred embodiments of the present invention will be described with reference to the accompanying drawings, wherein like reference numerals refer to like elements throughout. The embodiments are described below so as to explain the present invention by referring to the figures.

Figure 2:
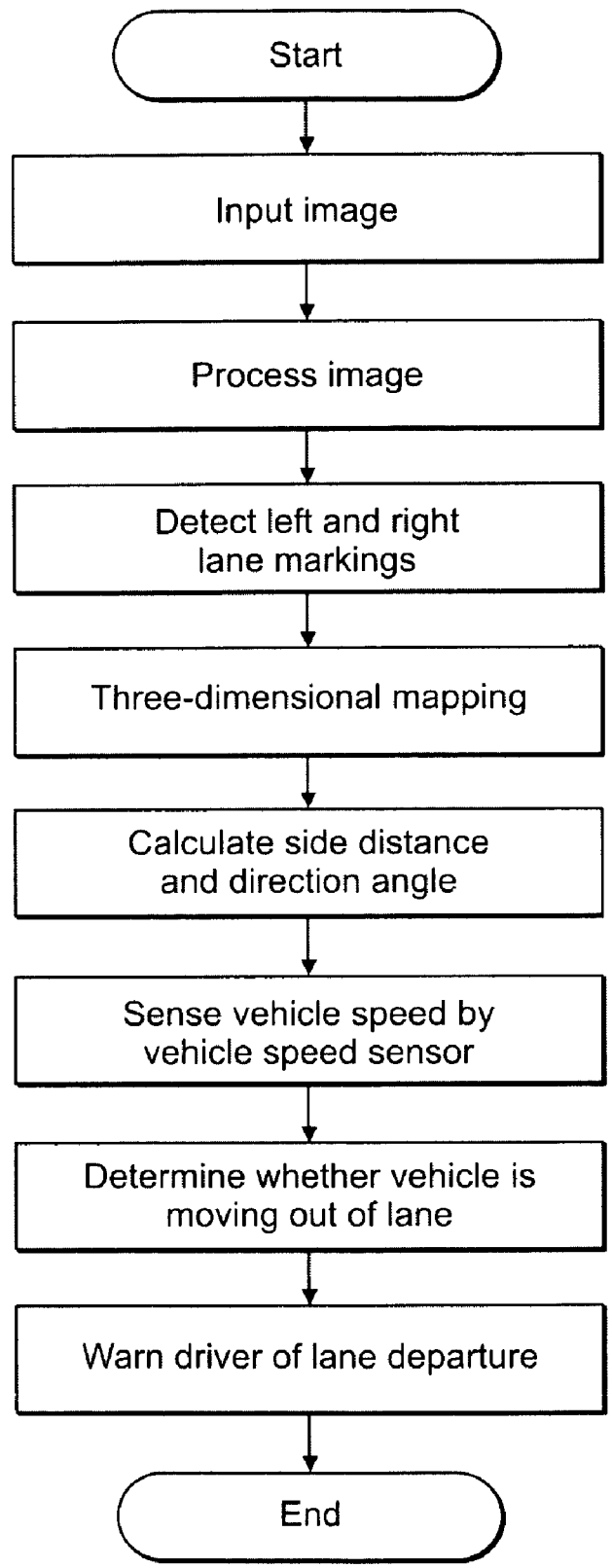
FIG. 2 is a flow chart of a method for preventing lane departure for use in a vehicle according to a preferred embodiment of the present invention.

FIG. 2 is a flow chart of a method for preventing lane departure for use in a vehicle according to the present invention.

First, as shown in FIG. 2, the method for preventing lane departure for use in a vehicle according to a preferred embodiment of the present invention includes a first step of inputting images of the rear of the vehicle by cameras mounted on side mirrors of the vehicle and-extracting, by processing the inputted images, markings of left and right lanes of the road the vehicle is traveling.

The first step includes a process of performing three-dimensional mapping in order to realize, in real coordinates, the lane markings extracted from the images inputted from the cameras, and calculating a line composed of the real coordinates.

Figure 3:
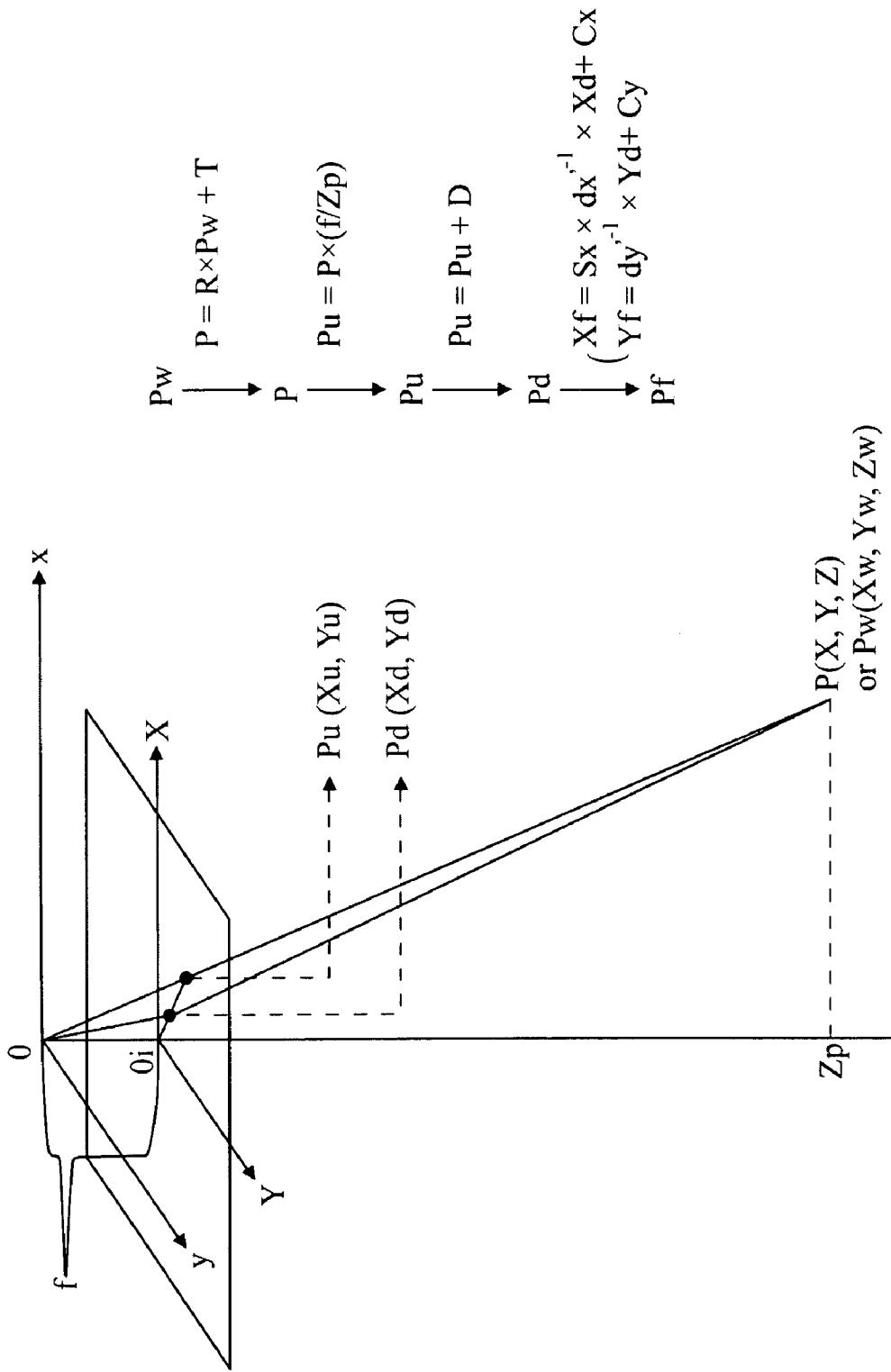
FIG. 3 is a disclosure of the use of Tsai's equation.

FIG. 3 is a disclosure of the use of Tsai's equation.

The three-dimensional mapping in the first step is a step of converting image coordinates into real coordinates by the Tsai's equation. This is for compensating for an error generated from a conventional variable calculation method where variables are obtained by lane markings inputted in images. Of course, the error includes distortion aberration caused by a camera lens.

Hereinafter, a method of calculating real coordinates by moving the Tsai's equation in the reverse direction will be described in detail.

For the convenience of explanation, image coordinates reflected on a CCD sensor are denoted by Pf, projective coordinates where the distortion of a lens is reflected are denoted by Pd, ideally, projected image coordinates are denoted by Pu, a position indicated by a camera coordinate system is denoted by P, and a position indicated by a real coordinate system is denoted by Pw.

First, xy coordinates Xf and Yf of Pf are sensed from the CCD sensor, and inputted into the following Equation 1, to calculate xy coordinates Xd and Yd of Pd.

$$Xf = S_x * d_x'^{-1} * Xd + Cx$$

$$Yf = d_y'^{-1} * Yd + Cy \qquad \text{[Equation 1]}$$

wherein Sx is defined as a scale variable, Cx and Cy are defined as image center points, and dx' and dy' are defined in the following Equation 2. Preferably, the scale variable Sx has a different value depending on shooting conditions by applying various factors to be considered in coordinate transformation.

Further, the image center points are values that vary according to the resolution of the camera. For example, Cx and Cy are preferably set to 320 and 240, respectively, at a resolution of 640*480.

$$d_x' = dx * (Ncx/Nfx)$$

$$d_y' = dy * (Ncy/Nfy) \qquad \text{[Equation 2]}$$

wherein dx and dy are defined as the distance between pixels of the CCD sensor mounted on the camera, Nc is defined as the quantity of unit sensors, and Nf is defined as the number of pixels of an image inputted by the camera.

These values may vary according to the type of the CCD sensor of the camera attached to the side mirrors.

Therefore, the distances dx and dy between sensor pixels, the quantity Nc of unit sensors, and the number Nf of pixels of a computer image are inputted into Equation 2 to calculate dx' and dy', and these values and image coordinates Pf-Xf and Yf reflected on the CCD sensor are inputted into Equation 1 to calculate projective image coordinates Pd-Xd and Yd where the distortion of the lens is reflected, thereby compensating for a coordinate measurement error of the CCD sensor mounted on the camera.

Next, the projective image coordinates Pd-Xd and Yd where the distortion aberration of the lens is reflected and a distortion correction value D are inputted into the following Equation 3 to obtain ideally projected image coordinates Pu, thereby compensating for the distortion aberration caused by the lens.

$$Pu = Pd + D \qquad \text{[Equation 3]}$$

Next, the ideally projected image coordinates Pu, a focal distance f, and a z-axis distance zp are inputted into the following Equation 4 to obtain the position P indicated by the camera coordinate system, and these values and scale variables R and T are inputted into the following Equation 5 to calculate the position Pw indicated by the real coordinate system.

Herein, the focal distance represents a z-axis focal distance of the camera lens, and the z-axis distance represents a z-coordinate of the position P indicated by the camera coordinate system.

$$Pu = P * (f/z) \qquad \text{[Equation 4]}$$

$$P = R * Pw + T \qquad \text{[Equation 5]}$$

Figure 4:
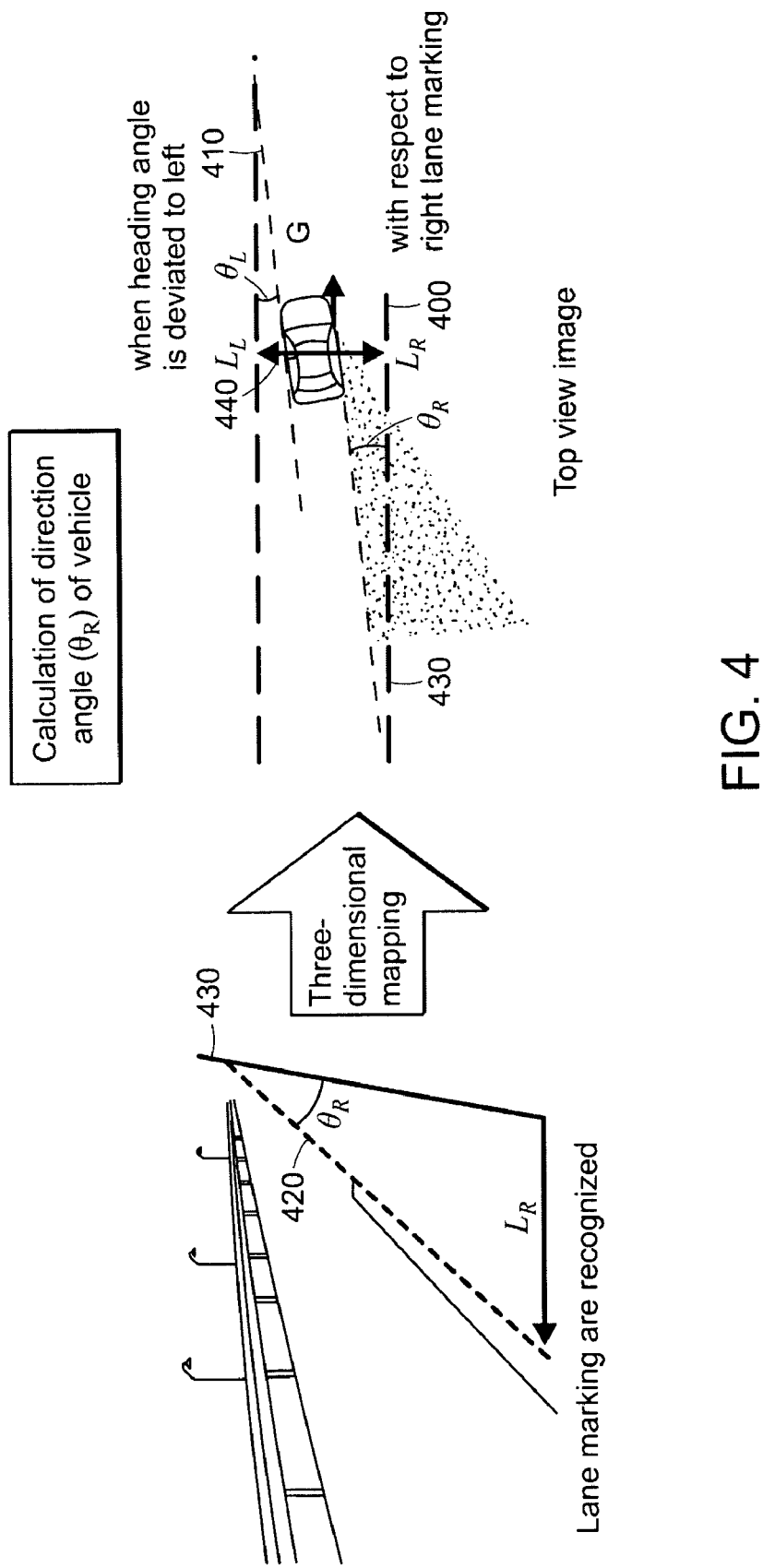
FIG. 4 is a disclosure of three-dimensional mapping when the vehicle is deviated to the left side.
Figure 5:
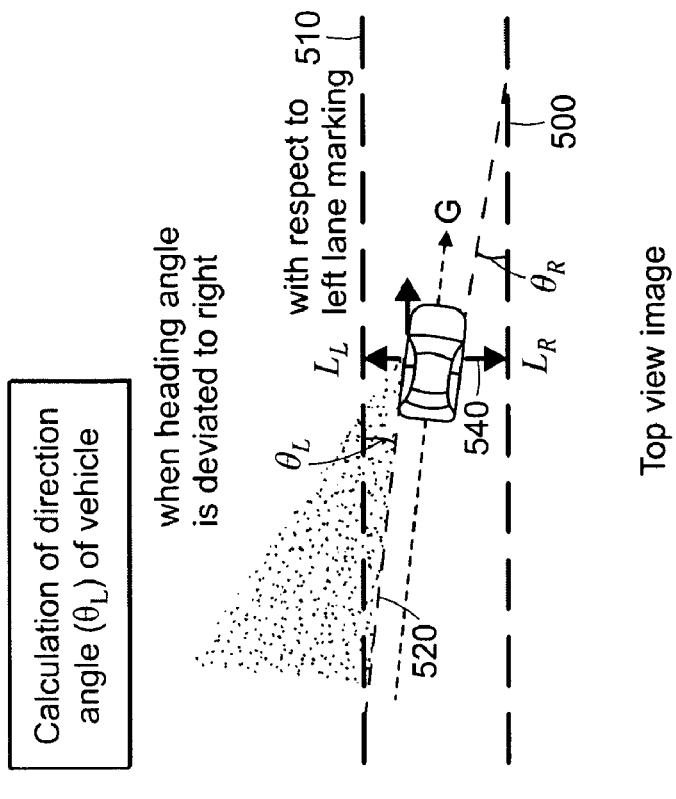
FIG. 5 is a disclosure of three-dimensional mapping when the vehicle is deviated to the right side.
Figure 5:
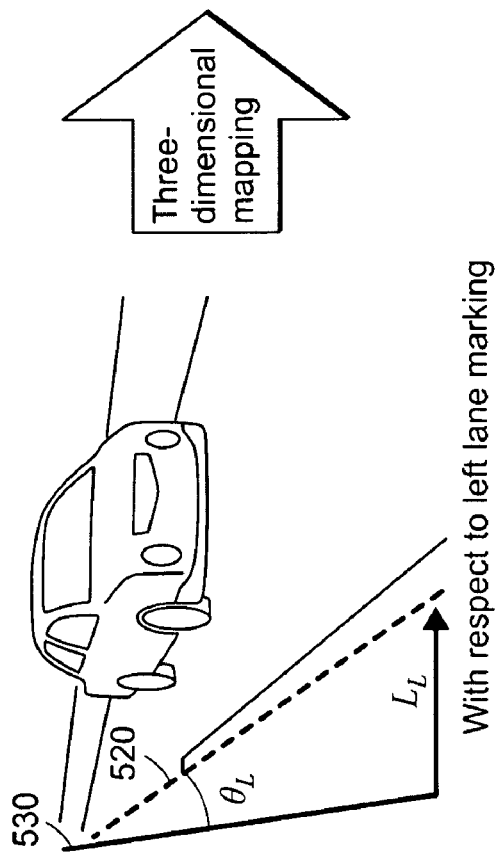

FIG. 4 is a disclosure of three-dimensional mapping when the vehicle is deviated to the left side. FIG. 5 is a disclosure of three-dimensional mapping when the vehicle is deviated to the right side.

As shown in FIGS. 4 and 5, lane markings 420 and 520 formed in image coordinates in the left drawing are three-dimensionally mapped to lane markings 400 and 500 formed in real coordinates Pw through the above-described procedure.

The method for preventing lane departure for use in a vehicle according to the present invention includes a second step of calculating direction angles θ R and θ L between the rear coordinate lines 400 and 500 formed by the first step, i.e., the above-described three-dimensional mapping, and the directions 430 and 530 of the vehicle and calculating side distances LR and LL between the real coordinate lines 400, 410, 500, and 510 and the vehicle.

Here, the direction angle θ and the side distance between the real coordinate lines and the vehicle that are calculated by the second step can be calculated, as detailed below, for two cases in which the vehicle in traveling is deviated to the left side and to the right side.

That is, as shown in FIG. 4, when the head of the vehicle is deviated to the left side, a right direction angle θ R is calculated based on the right rear coordinate line 400 and a left side distance LL is calculated based on the left real coordinate line 410.

Further, as shown in FIG. 5, when the head of the vehicle is deviated to the right side, a left direction angle θ L is calculated based on the left rear coordinate line 510 and a right side distance LR is calculated based on the right real coordinate line 500.

The right direction angle θ R and left direction angle θ L calculated when deviated to the left are alternate angles equal to each other, and the left direction angle θL and right direction angle θ R calculated when deviated to the right are alternate angles equal to each other, which enables the calculation of a direction angle according to respective directions.

Further, the left and right side distances are values obtained by measuring the distance from the lane markings to the intersection between the lines 440 and 540 extending perpendicularly from a point of the vehicle direction lines, which corresponds to the center point of the side body lines of the vehicle, and the real coordinate lines 410 and 500 of the lane markings, as shown in FIGS. 4 and 5.

Figure 6:
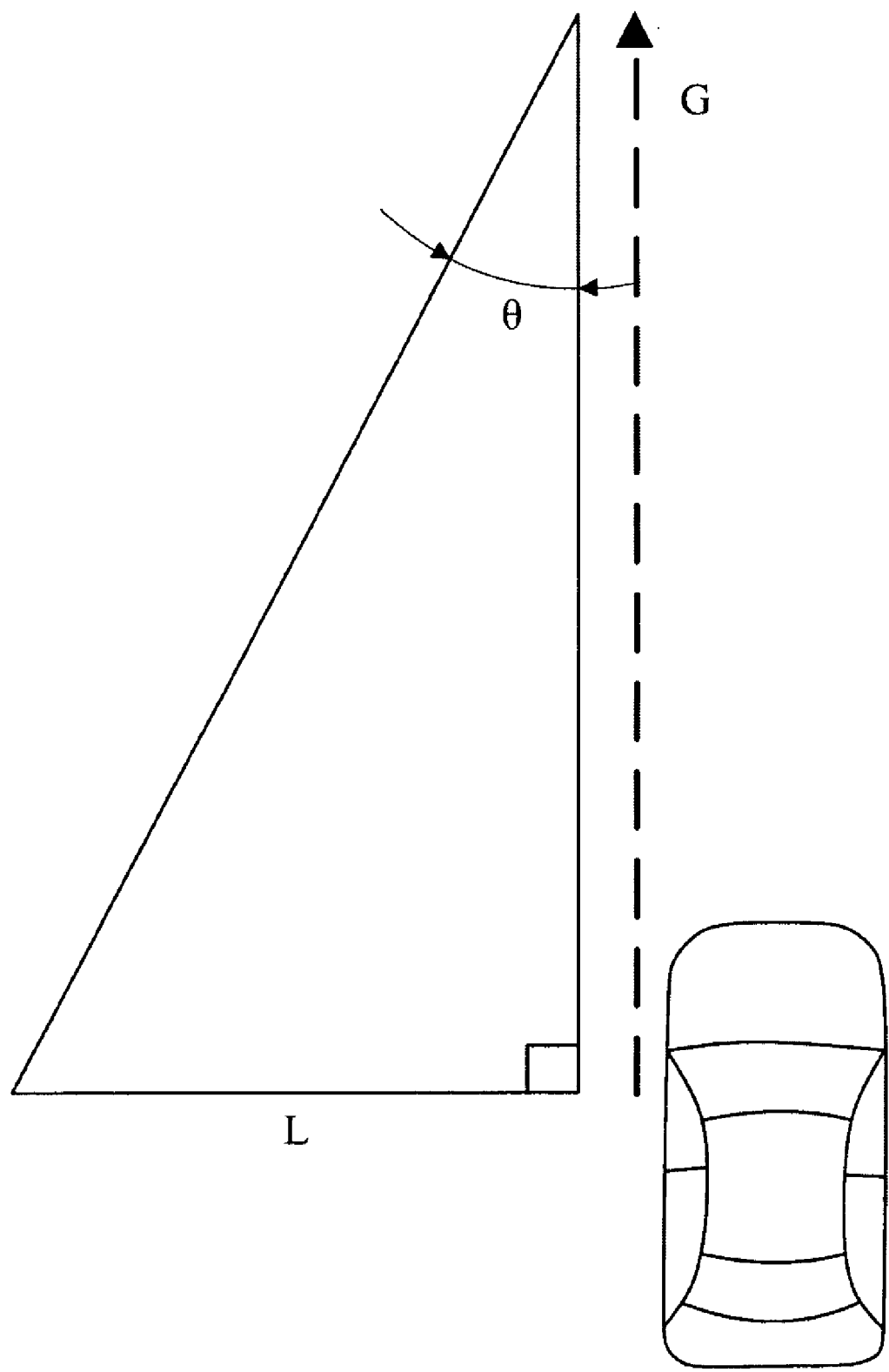
FIG. 6 is a disclosure of a departure distance of the method for preventing lane departure for use in a vehicle according to a preferred embodiment of the present invention.

FIG. 6 is a disclosure of a departure distance of the method for preventing lane departure for use in a vehicle according to the present invention.

The method for preventing lane departure for use in a vehicle according to the present invention includes a third step of calculating a lane departure distance G from the direction angle θ and side distance L calculated in the second step.

In other words, the direction angle θ and side distance L calculated in the second step form a right triangle, as shown in FIG. 6, by the lane departure distance G to be calculated in the third step, and the direction angles θ R and θ L and side distances LR and LL depending on a deviation direction are inputted into the following Equation 6 to calculate the lane departure distance G.

$$G = \tan(90-\theta)*L \quad \text{[Equation 6]}$$

Therefore, when deviated to the right side, the right direction angle θ R and the right side distance LR are inputted into Equation 6, and when deviated to the left side, the left direction angle θ L and the left side distance LL are inputted into Equation 6, in order to calculate the lane departure distance G.

Finally, the method for preventing lane departure for use in a vehicle according to a preferred embodiment of the present invention includes a fourth step of warning the driver of the possibility of departure from the lane of the vehicle at the right time depending on the lane departure distance calculated in the third step.

Herein, the fourth step is a step of calculating a lane departure time from the lane departure distance calculated in the third step and the vehicle speed sensed by a vehicle speed sensor and warning the driver if the departure time is less than a reference value.

Preferably, the reference value is set by taking into account a sufficient time required for the driver to recognize an issued warning and change the direction of the vehicle traveling in a lane departure direction to a normal direction.

As seen from above, the method for preventing lane departure for use in a vehicle according to the present invention provides the following effects.

First, it is possible to acquire values close to actual lane markings by correcting errors of the camera lens and the image sensor by three-dimensional mapping of the lane markers extracted from camera images.

Second, the number of variables required to calculate the lane departure distance G is reduced, to thus simplify the calculation logic.

Third, the lane departure time is estimated from the lane departure distance G and the vehicle speed, to thus prevent the driver from causing an accident.

The invention has been described in detail with reference to preferred embodiments thereof. However, it will be appreciated by those skilled in the art that changes may be made in these embodiments without departing from the principles and spirit of the invention, the scope of which is defined in the appended claims and their equivalents.

What is claimed is:

1. A method for preventing lane departure for use in a vehicle, comprising a machine and the steps of;
    (a) extracting lane markings from left and right images of the rear side inputted by cameras mounted on both side mirrors and calculating the real coordinate lines of the lane markings with the equation of a straight line by three-dimensional mapping of the extracted lane markings;
    (b) calculating left and right direction angles between the direction line of the vehicle and the real coordinate lines of the lane markings by using the real coordinates of the lane markings calculated in step (a) and calculating left and right side distances between the real coordinate lines of the lane markings and the vehicle; (c) calculating a lane departure distance from the direction angle and side distance calculated in step (b) wherein the left direction angle and the left side distance are used when the vehicle head is deviated to the left side, and a the right direction angle and the right side distance are used when the vehicle head is deviated to the right side; and
    (d) warning the driver of the possibility of lane departure depending on the lane departure distance calculated in step (c).

2. The method of claim 1, wherein the three-dimensional mapping of the step (a) compensates for distortion aberration caused by a camera lens when image coordinates are converted into real coordinates by Tsai's Equation.

3. The method of claim 1, wherein the side distances calculated in step (b) are obtained by measuring the distance from the lane markings to the intersection between the lines extending perpendicularly from a point of the vehicle direction lines, which corresponds to the center point of the side body lines of the vehicle, and the real coordinate lines of the lane markings.

4. The method of claim 1, wherein, in step (d), a lane departure time is calculated from the lane departure distance calculated in step (c) and a vehicle speed information detected by a vehicle speed sensor and, if the departure time is less than a reference value, warning is issued.

5. The method of claim 1, wherein, in step (c), the lane departure distance G is calculated by inputting a direction angle (θ) and a side distance (L) into the following Equation:

$$G = \tan(90-\theta)*L.$$

* * * * *